United States Patent
Mugunda et al.

(10) Patent No.: US 11,321,071 B2
(45) Date of Patent: May 3, 2022

(54) INTELLIGENT DEVICE UPDATING

(71) Applicant: Dell Products L.P., Round Rock, TX (US)

(72) Inventors: Chandrasekhar Mugunda, Austin, TX (US); Yogesh Prabhakar Kulkarni, Round Rock, TX (US); Sruthi Reddy Mothukupally, Cedar Park, TX (US); Rui An, Austin, TX (US); Akshata Sheshagiri Naik, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 270 days.

(21) Appl. No.: 16/811,996

(22) Filed: Mar. 6, 2020

(65) Prior Publication Data
US 2021/0279046 A1 Sep. 9, 2021

(51) Int. Cl.
*G06F 8/65* (2018.01)
*G06F 13/36* (2006.01)

(52) U.S. Cl.
CPC .............. *G06F 8/65* (2013.01); *G06F 13/36* (2013.01)

(58) Field of Classification Search
USPC ........................................................ 717/169
See application file for complete search history.

(56) References Cited

U.S. PATENT DOCUMENTS

| | | | |
|---|---|---|---|
| 8,935,688 B2 * | 1/2015 | Cornwell ................ | G06F 8/654 717/168 |
| 2008/0189419 A1 * | 8/2008 | Girle ....................... | G06F 8/65 709/227 |
| 2011/0296408 A1 * | 12/2011 | Lo ............................ | G06F 8/65 718/1 |
| 2013/0179870 A1 * | 7/2013 | Kelso ....................... | G06F 8/65 717/169 |
| 2016/0011887 A1 * | 1/2016 | Chung .................... | G06F 1/266 713/2 |

(Continued)

OTHER PUBLICATIONS

Donald Papp; "I2C Bootloader for ATtiny85 Lets Other Micros Push Firmware Updates"; Hackaday.com website [full url in ref.]; 2018 (Year: 2018).*

(Continued)

*Primary Examiner* — Qing Chen
*Assistant Examiner* — Clint Thatcher
(74) *Attorney, Agent, or Firm* — Jackson Walker L.L.P.

(57) ABSTRACT

An information handling system may include an information handling resource, and a management controller configured to provide out-of-band management of the information handling system and coupled to the information handling resource via a communications bus. The management controller may be configured to cause the information handling resource to update a firmware thereof by transmitting a plurality of datagrams to the information handling resource via the communications bus, wherein the plurality of datagrams includes: a pilot datagram comprising a first header that includes information regarding an update payload, wherein the pilot datagram is configured to trigger an update handler of the information handling resource; and one or more subsequent datagrams comprising second headers and respective portions of the update payload, wherein the update handler is configured to update the firmware based on the update payload.

20 Claims, 4 Drawing Sheets

(56) References Cited

U.S. PATENT DOCUMENTS

2017/0154005 A1* 6/2017 Ahmed ............... G06F 13/4081
2018/0157481 A1* 6/2018 Zessin .................. H04L 9/3239
2018/0225230 A1* 8/2018 Litichever ............... G06F 21/82

OTHER PUBLICATIONS

Jonathan Valdez, Jared Becker; "Understanding the I2C Bus"; Texas Instruments (ti.com) website; 2015 (Year: 2015).*
"Unit 4 Part 1: Communications—Serial Protocol"; digilent.com website; 2017 (Year: 2017).*

* cited by examiner

INTELLIGENT DEVICE UPDATING

TECHNICAL FIELD

The present disclosure relates in general to information handling systems, and more particularly to updating the firmware of information handling resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system platforms with increasingly complex features and needs may benefit from fast-paced development with solutions that can fit in within a given timeframe. Accordingly, it may be desirable for users to be able to update components such as power distribution boards (PDBs), PCIe switch boards (PSBs), other types of complex programmable logic devices (CPLDs), etc. by using a raw firmware update payload.

In some situations, however, not all such components may be supported by the usual firmware update procedures using standard management controller or host operating system techniques.

Many users prefer to use Intelligent Platform Management Interface (IPMI) and an Inter-Integrated Circuit ($I^2C$) bus for such management tasks. Accordingly, there is a need for an update method that uses standard tools such as IPMI, and that can handle raw update payloads for a given component.

It is to be noted that various terms discussed herein are described in the Intelligent Platform Management Interface (IPMI) Specification Second Generation v2.0, Revision 1.1, released Oct. 1, 2013 (hereinafter, IPMI Specification), which is hereby incorporated by reference in its entirety. One of ordinary skill in the art with the benefit of this disclosure will understand its applicability to other specifications (e.g., prior or successor versions of the IPMI Specification). Further, some embodiments may be applicable to different technologies other than IPMI.

It is to be further noted that various terms discussed herein are described in the $I^2C$-Bus Specification and User Manual Rev. 6, released Apr. 4, 2014 (hereinafter, $I^2C$ Specification), which is hereby incorporated by reference in its entirety. One of ordinary skill in the art with the benefit of this disclosure will understand its applicability to other specifications (e.g., prior or successor versions of the $I^2C$ Specification). Further, some embodiments may be applicable to different technologies other than $I^2C$.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with updating firmware of information handling resources may be reduced or eliminated.

In accordance with embodiments of the present disclosure, an information handling system may include an information handling resource, and a management controller configured to provide out-of-band management of the information handling system and coupled to the information handling resource via a communications bus. The management controller may be configured to cause the information handling resource to update a firmware thereof by transmitting a plurality of datagrams to the information handling resource via the communications bus, wherein the plurality of datagrams includes: a pilot datagram comprising a first header that includes information regarding an update payload, wherein the pilot datagram is configured to trigger an update handler of the information handling resource; and one or more subsequent datagrams comprising second headers and respective portions of the update payload, wherein the update handler is configured to update the firmware based on the update payload.

In accordance with these and other embodiments of the present disclosure, a method may include in an information handling system comprising a management controller configured to provide out-of-band management of the information handling system and coupled to an information handling resource of the information handling system via a communications bus: the management controller causing the information handling resource to update a firmware thereof by transmitting a plurality of datagrams to the information handling resource via the communications bus. The plurality of datagrams may include: a pilot datagram comprising a first header that includes information regarding an update payload, wherein the pilot datagram is configured to trigger an update handler of the information handling resource; and one or more subsequent datagrams comprising second headers and respective portions of the update payload, wherein the update handler is configured to update the firmware based on the update payload.

In accordance with these and other embodiments of the present disclosure, an article of manufacture may include a non-transitory, computer-readable medium having computer-executable code thereon that is executable by a processor of a management controller of an information handling system for: causing an information handling resource of the information handling system to update a firmware thereof by transmitting a plurality of datagrams to the information handling resource via a communications bus. The plurality of datagrams may include: a pilot datagram comprising a first header that includes information regarding an update payload, wherein the pilot datagram is configured to trigger an update handler of the information handling resource; and one or more subsequent datagrams comprising second headers and respective portions of the update payload, wherein the update handler is configured to update the firmware based on the update payload.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
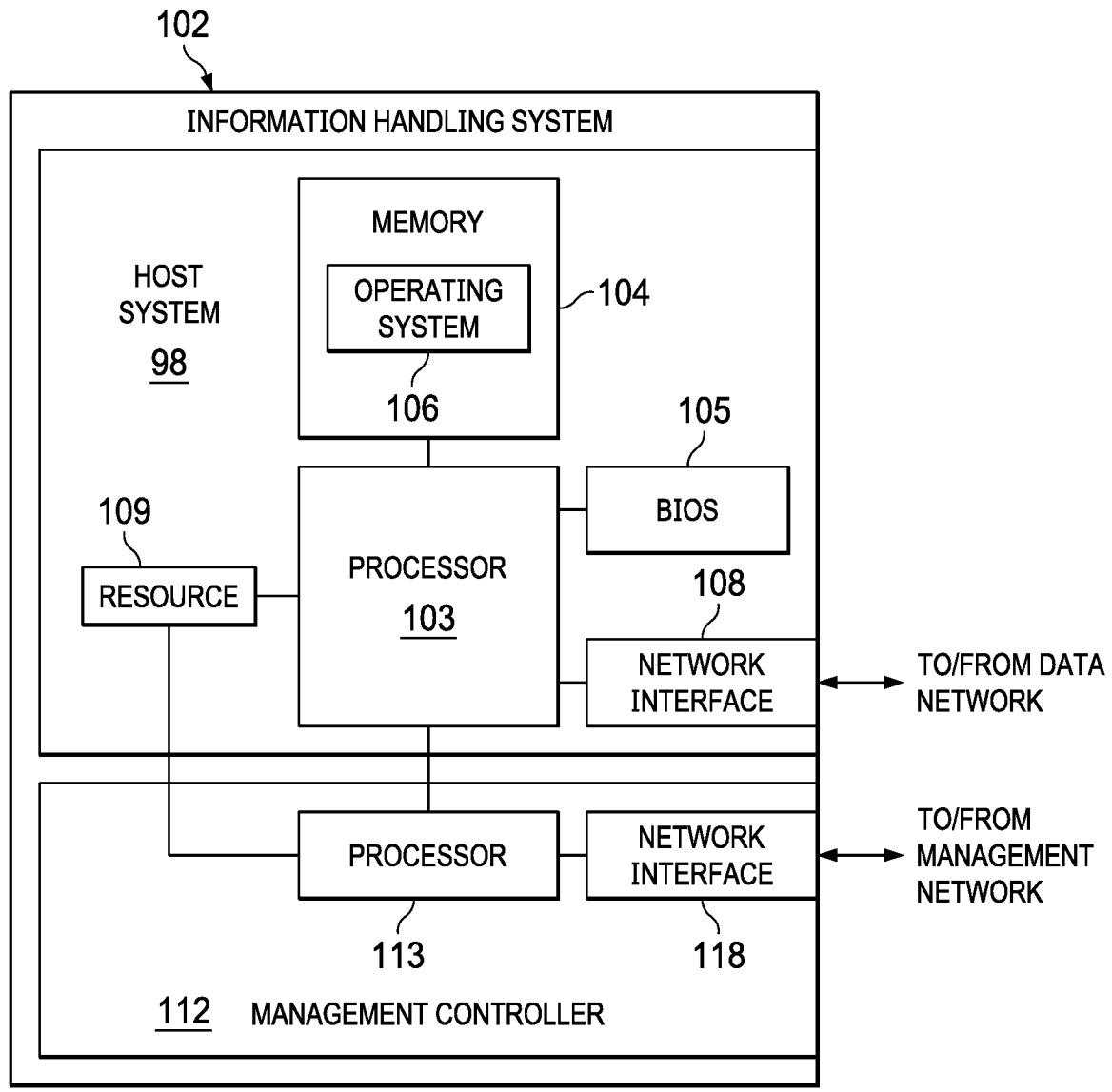
FIG. 1 illustrates a block diagram of an example information handling system, in accordance with embodiments of the present disclosure.

Preferred embodiments and their advantages are best understood by reference to FIGS. 1 through 4, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

Host system 98 may also include information handling resource 109. Information handling resource 109 may be coupled to processor 103 (e.g., via a PCI interface, a PCIe interface, a USB interface, or any other suitable communications interface). Information handling resource 109 may further be coupled to processor 113 of management controller 112 (e.g., via an I$^2$C interface or any other suitable communications interface).

For example, information handling resource 109 may comprise a CPLD. Information handling resource 109 may further comprise a firmware to be updated, which may be embodied in an EEPROM or any other suitable circuitry.

Management controller 112 may provide a Master Write-Read command for interfacing with information handling resource 109. Such a command may provide low-level access to information handling resource 109, and may also provide implementation of one or more private buses.

Embodiments of this disclosure may enable the ability to remotely update components such as the firmware of information handling resource 109 using a raw payload. The I$^2$C Master Write-Read command may be used in some embodiments to implement such update functionality by defining a new private bus, which may direct requests to a custom update handler that may be implemented on information handling resource 109. Such a custom update handler may carry out the raw payload firmware update. This private bus may in some embodiments also be extended to handle other tasks such as getting PCIe switch partition information, getting die information, and any other suitable tasks as may be desired in a particular implementation.

Figure 2:
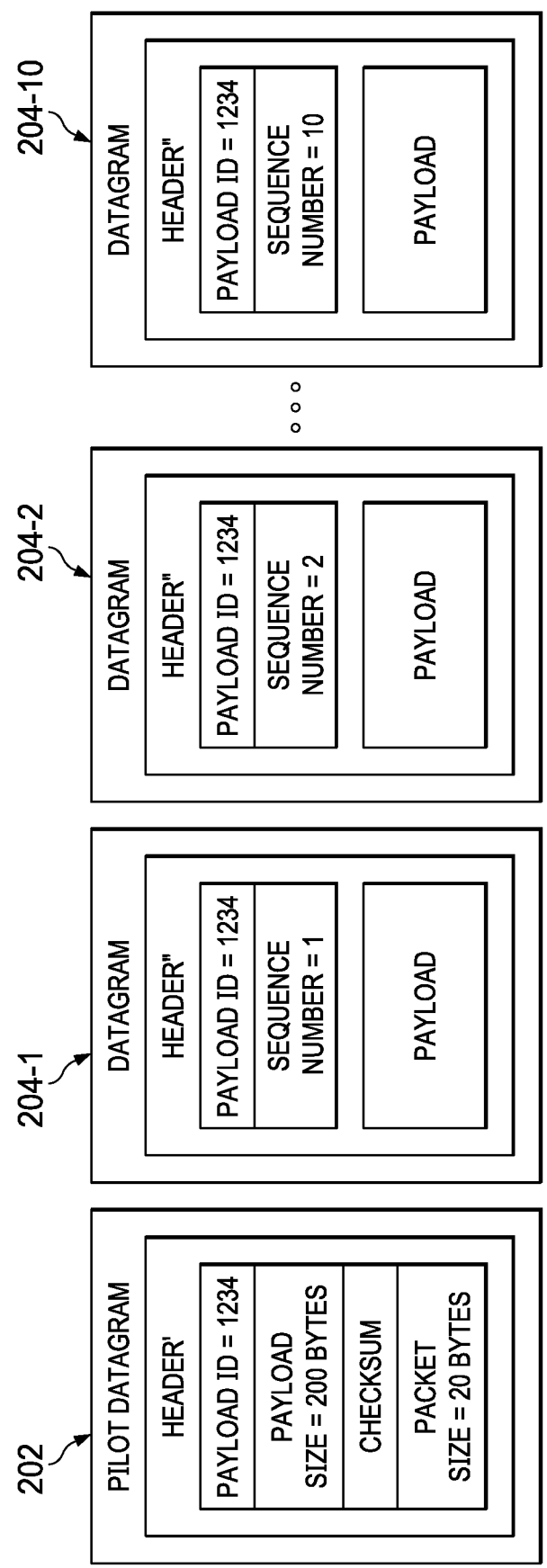
FIG. 2 illustrates example datagrams that may be used to update a device firmware, in accordance with embodiments of the present disclosure.

As described in further detail herein, the update procedure may be accomplished by sending a plurality of datagrams (e.g., packets) over an I$^2$C bus via the Master Write-Read command to a device such as information handling resource 109. FIG. 2 provides an example set of such datagrams.

As shown in FIG. 2, a pilot datagram 202 may first be sent to the device. Pilot datagram 202 may include a header data structure referred to as header', which may include various metadata about the raw payload which is to be delivered. Such metadata may include information such as a payload ID, a payload size, a payload checksum to ensure data integrity, a packet size, etc. In some embodiments, in addition to or in lieu of a checksum, header' may include a signature (e.g., a cryptographic signature) to verify the authenticity of the payload. Once pilot datagram 202 is received, all consecutive requests are sent to the right target device for update.

Subsequent update datagrams 204-1 through 204-10 may include a header data structure referred to as header". Header" may include information such as the payload ID (which should match the payload ID from header' in pilot datagram 202). Header" may also include a sequence number, which may be used to determine the correct order of datagrams 204-1 through 204-10 to reconstruct the payload. As further shown in FIG. 2, each datagram 204-1 through 204-10 may also include a respective portion of the raw payload. As one of ordinary skill in the art with the benefit of this disclosure will understand, any suitable number of datagrams 204 may be used in a given situation (e.g., based on the size of the update payload, the packet size, etc.). As shown in FIG. 2, pilot datagram 202 may not itself include any portion of the payload. In other embodiments, however, pilot datagram 202 may include a portion of the payload.

Figure 3:
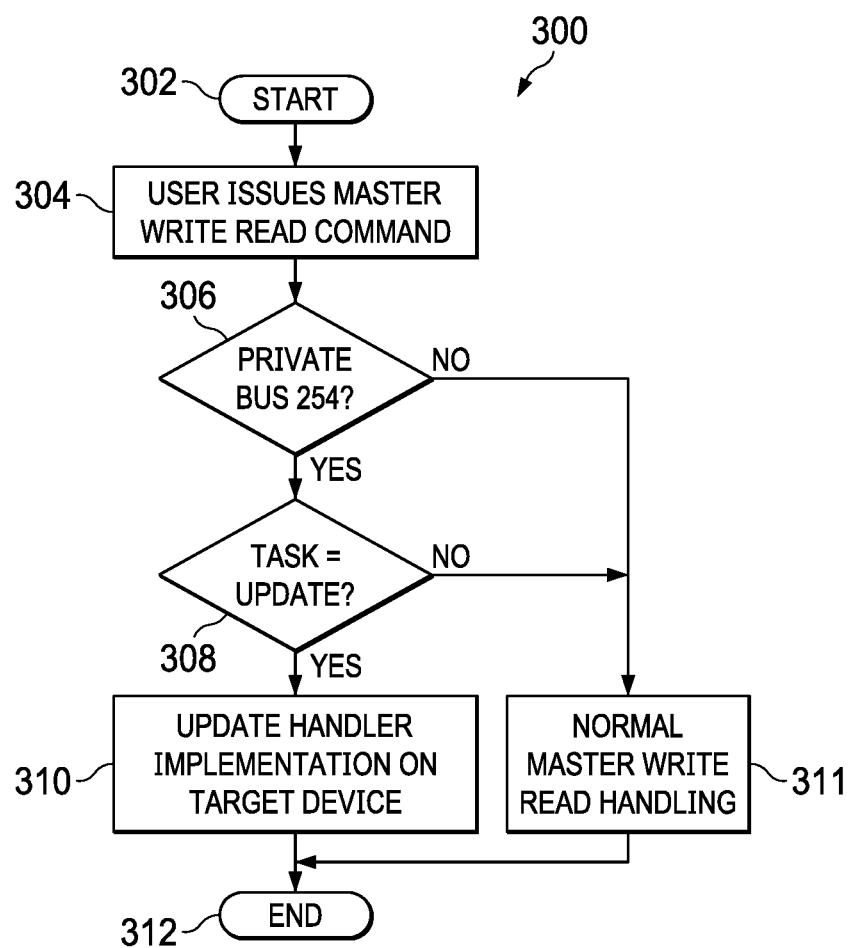
FIG. 3 illustrates an example flow diagram of a method in accordance with embodiments of the present disclosure.

Turning now to FIG. 3, a flow chart is shown of an example method 300 for sending a firmware update to a device, according to some embodiments.

Method 300 may start at step 302. At step 304, a user may issue a Master Write-Read command to a device via an I²C bus. As noted above, a private bus may be defined for firmware update functionality. At step 306, a determination is made whether the command corresponds to the correct private bus number (254 in this example). If not, the method may proceed to normal Master Write-Read handling at step 311 and then end.

At step 308, a determination is made whether the command corresponds to an update task. (As noted above, private buses may also be used to implement other functionality.) If not, the method may proceed to normal Master Write-Read handling at step 311 and then end.

At step 310, a custom update handler implemented on the device may be triggered to cause the firmware to be updated in accordance with the raw payload. At step 312, the method may end.

Figure 4:
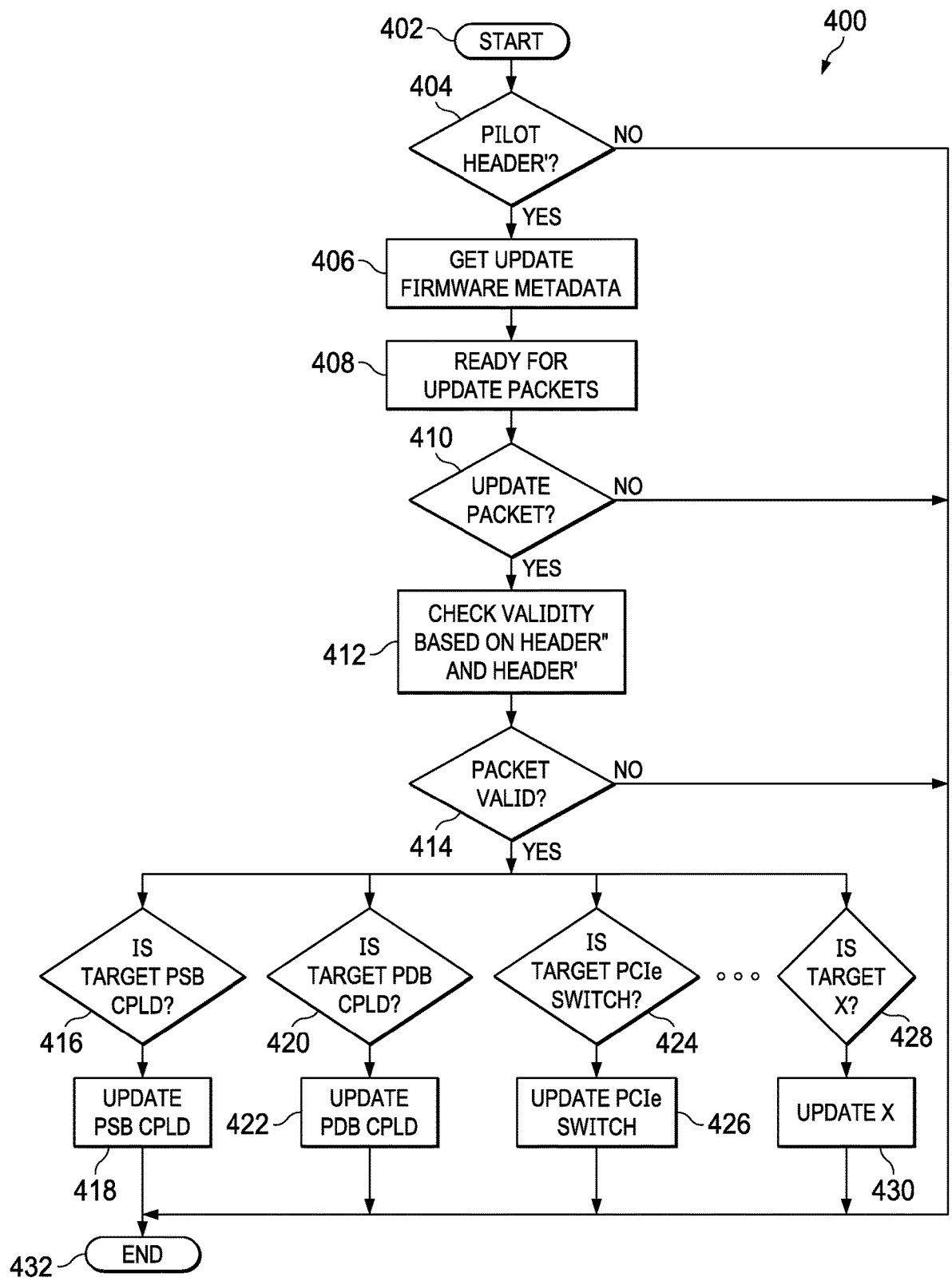
FIG. 4 illustrates an example flow diagram of a method in accordance with embodiments of the present disclosure.

Turning now to FIG. 4, a flow chart is shown of an example method 400 for processing a firmware update at a custom update handler, according to some embodiments.

Method 400 may start at step 402 when a Master Write-Read datagram (e.g., a packet) is received. At step 404, the custom update handler may determine whether the datagram is a pilot datagram including a pilot header' data structure as discussed above. If so, the method may proceed to step 406. If not, the method may end at step 432.

At step 406, the custom update handler may get metadata for the firmware update from the header' data structure. After processing such metadata, the custom update handler may be ready for additional update packets at step 408, and the method may wait until another packet is received.

At step 410, if a non-pilot datagram is received, the custom update handler determines whether it is an update packet (e.g., a subsequent update packet such as datagram 204-1 from FIG. 2).

At steps 412 and 414, the custom update handler may determine whether the received datagram is valid (e.g., by comparing information contained in its header'' with the information from a previously received pilot datagram's header' data structure). If the packet is valid, the method may proceed to a determination of which device the packet is intended for.

At steps 416, 420, 424, and 428, the custom update handler may check to see if the target for the update is a CPLD of a PSB, a CPLD of a PDB, a PCIe switch, or any other information handling resource "X". Such determination may be made, for example, based on the information in one or more header data structures.

Once the determination of the correct target device is made, that target device is updated at one of steps 418, 422, 426, or 430 as appropriate. The details of how the raw firmware update is applied by the device may depend on the specific requirements of that device, and one of ordinary skill in the art with the benefit of this disclosure may tailor the implementation details as needed. The method may then end at step 432.

One of ordinary skill in the art with the benefit of this disclosure will understand that the preferred initialization point for the methods depicted in FIGS. 3-4 and the order of the steps comprising those methods may depend on the implementation chosen. In these and other embodiments, this method may be implemented as hardware, firmware, software, applications, functions, libraries, or other instructions. Further, although FIGS. 3-4 disclose a particular number of steps to be taken with respect to the disclosed methods, the methods may be executed with greater or fewer steps than those depicted. The methods may be implemented using any of the various components disclosed herein (such as the components of FIG. 1), and/or any other system operable to implement the method.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
an information handling resource; and
a management controller configured to provide out-of-band management of the information handling system and coupled to the information handling resource via a communications bus;
wherein the management controller is configured to cause the information handling resource to update a firmware thereof by transmitting a plurality of datagrams to the information handling resource via the communications bus, wherein the plurality of datagrams includes:
a pilot datagram comprising a first header that includes information regarding an update payload, wherein the pilot datagram is configured to trigger an update handler of the information handling resource; and
one or more subsequent datagrams comprising second headers and respective portions of the update payload, wherein the update handler is configured to update the firmware based on the update payload.

2. The information handling system of claim 1, wherein the communications bus is an Intelligent Platform Management Interface (IPMI) Inter-Integrated Circuit (I²C) bus.

3. The information handling system of claim 2, wherein the plurality of datagrams comprises an I²C Master Write-Read command.

4. The information handling system of claim 3, wherein the plurality of datagrams correspond to a private bus configured to deliver the plurality of datagrams to the update handler.

5. The information handling system of claim 1, wherein the datagrams comprise packets.

6. The information handling system of claim 1, wherein the pilot datagram comprises a signature corresponding to the update payload.

7. The information handling system of claim 1, wherein the first header includes a value indicative of an identifier for the update payload, a value indicative of a size of the update payload, a value indicative of a checksum of the update payload, and a value indicative of a datagram size for the plurality of datagrams.

8. The information handling system of claim 1, wherein the update payload comprises raw binary data to be written to the firmware.

9. A method comprising:
in an information handling system comprising a management controller configured to provide out-of-band management of the information handling system and coupled to an information handling resource of the information handling system via a communications bus:
the management controller causing the information handling resource to update a firmware thereof by transmitting a plurality of datagrams to the information handling resource via the communications bus, wherein the plurality of datagrams includes:
a pilot datagram comprising a first header that includes information regarding an update payload, wherein the pilot datagram is configured to trigger an update handler of the information handling resource; and
one or more subsequent datagrams comprising second headers and respective portions of the update payload, wherein the update handler is configured to update the firmware based on the update payload.

10. The method of claim 9, wherein the communications bus is an Intelligent Platform Management Interface (IPMI) Inter-Integrated Circuit (I²C) bus, and wherein the plurality of datagrams comprises an I²C Master Write-Read command.

11. The method of claim 10, wherein the plurality of datagrams correspond to a private bus configured to deliver the plurality of datagrams to the update handler.

12. The method of claim 9, wherein the first header includes a value indicative of an identifier for the update payload, a value indicative of a size of the update payload, a value indicative of a checksum of the update payload, and a value indicative of a datagram size for the plurality of datagrams.

13. An article of manufacture comprising a non-transitory, computer-readable medium having computer-executable code thereon that is executable by a processor of a management controller of an information handling system for:
causing an information handling resource of the information handling system to update a firmware thereof by transmitting a plurality of datagrams to the information handling resource via a communications bus, wherein the plurality of datagrams includes:
a pilot datagram comprising a first header that includes information regarding an update payload, wherein the pilot datagram is configured to trigger an update handler of the information handling resource; and
one or more subsequent datagrams comprising second headers and respective portions of the update payload, wherein the update handler is configured to update the firmware based on the update payload.

14. The article of claim 13, wherein the communications bus is an Intelligent Platform Management Interface (IPMI) Inter-Integrated Circuit (I²C) bus.

15. The article of claim 14, wherein the plurality of datagrams comprises an I²C Master Write-Read command.

16. The article of claim 15, wherein the plurality of datagrams correspond to a private bus configured to deliver the plurality of datagrams to the update handler.

17. The article of claim 13, wherein the datagrams comprise packets.

18. The article of claim 13, wherein the pilot datagram comprises a signature corresponding to the update payload.

19. The article of claim 13, wherein the first header includes a value indicative of an identifier for the update payload, a value indicative of a size of the update payload, a value indicative of a checksum of the update payload, and a value indicative of a datagram size for the plurality of datagrams.

20. The article of claim 13, wherein the update payload comprises raw binary data to be written to the firmware.

* * * * *